(12) United States Patent
Kottapalli et al.

(10) Patent No.: US 10,883,541 B2
(45) Date of Patent: Jan. 5, 2021

(54) ELECTRICALLY ISOLATED NON-SEALED BEARING

(71) Applicant: SCHAEFFLER TECHNOLOGIES AG & CO. KG, Herzogenaurach (DE)

(72) Inventors: Venkata Kottapalli, Fort Mill, SC (US); Hareshkumar Dalsaniya, Charlotte, NC (US); Daniel Wise, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 108 days.

(21) Appl. No.: 16/279,375

(22) Filed: Feb. 19, 2019

(65) Prior Publication Data
US 2020/0263734 A1    Aug. 20, 2020

(51) Int. Cl.
| | |
|---|---|
| *F16C 33/58* | (2006.01) |
| *F16C 33/46* | (2006.01) |
| *F16C 41/00* | (2006.01) |
| *F16C 33/82* | (2006.01) |
| *F16C 32/04* | (2006.01) |
| *H01R 39/64* | (2006.01) |

(52) U.S. Cl.
CPC .......... *F16C 33/58* (2013.01); *F16C 32/0436* (2013.01); *F16C 33/4605* (2013.01); *F16C 33/583* (2013.01); *F16C 33/82* (2013.01); *F16C 41/002* (2013.01); *H01R 39/643* (2013.01); *F16C 2202/32* (2013.01)

(58) Field of Classification Search
CPC .. F16C 19/06; F16C 32/0436; F16C 32/4605; F16C 33/58; F16C 33/82; F16C 33/583; F16C 41/002; F16C 2202/37; F16C 2202/32; F16J 15/064; H01R 39/643
USPC ............ 384/476; 361/212, 220–221; 439/17; 174/367
See application file for complete search history.

(56) References Cited

U.S. PATENT DOCUMENTS

| | | |
|---|---|---|
| 3,271,723 A | 9/1966 | Willing |
| 3,564,477 A | 2/1971 | Pompei |
| 4,801,270 A | 1/1989 | Scarlata |
| (Continued) | | |

FOREIGN PATENT DOCUMENTS

| | | | | |
|---|---|---|---|---|
| CN | 106402177 A | * | 2/2017 | ............ F16C 41/002 |
| DE | 102014204719 A1 | * | 11/2014 | .............. F16C 33/78 |
| (Continued) | | | | |

*Primary Examiner* — Marcus Charles
(74) *Attorney, Agent, or Firm* — Brooks Kushman P.C.

(57) ABSTRACT

A bearing includes an inner ring having an outer surface defining a first pocket therein. The surface of the first pocket can be provided with a first conductive coating. The bearing includes an outer ring concentric with and radially outward from the inner ring. The outer ring has an inner surface defining a second pocket therein, and a surface of the second pocket can be provided with a second conductive coating. A plurality of rolling elements are disposed between the inner ring and the outer ring. An electrically-conductive shunt ring assembly couples the inner ring to the outer ring and is configured to inhibit electrical current passing between the inner ring and outer ring from passing through the rolling elements. The shunt ring assembly is sized and configured to enable lubricant to flow freely through the bearing. In some embodiments, the shunt ring is a conductive snap ring.

20 Claims, 6 Drawing Sheets

(56) References Cited

U.S. PATENT DOCUMENTS

| | | | |
|---|---|---|---|
| 7,339,777 B2 | 3/2008 | Barnard et al. | |
| 7,528,513 B2 * | 5/2009 | Oh | H02K 11/40 |
| | | | 310/88 |
| 7,878,814 B2 * | 2/2011 | Chin | F16J 15/064 |
| | | | 439/17 |
| 9,175,728 B2 | 11/2015 | White | |
| 9,581,203 B2 * | 2/2017 | White | F16C 33/62 |
| 10,253,818 B1 * | 4/2019 | Ince | F16C 19/52 |
| 2004/0233592 A1 | 11/2004 | Oh et al. | |
| 2014/0334758 A1 * | 11/2014 | White | F16C 33/4605 |
| | | | 384/477 |
| 2016/0312834 A1 * | 10/2016 | White | F16C 33/7823 |
| 2017/0108047 A1 * | 4/2017 | White | F16C 19/52 |

FOREIGN PATENT DOCUMENTS

| | | | |
|---|---|---|---|
| FR | 2565643 A1 * | 12/1985 | F16C 33/7859 |
| JP | 2018168967 A * | 11/2018 | F16C 41/00 |
| WO | WO-2017047772 A1 * | 3/2017 | F16C 33/58 |
| WO | 201877461 A1 | 10/2018 | |

* cited by examiner

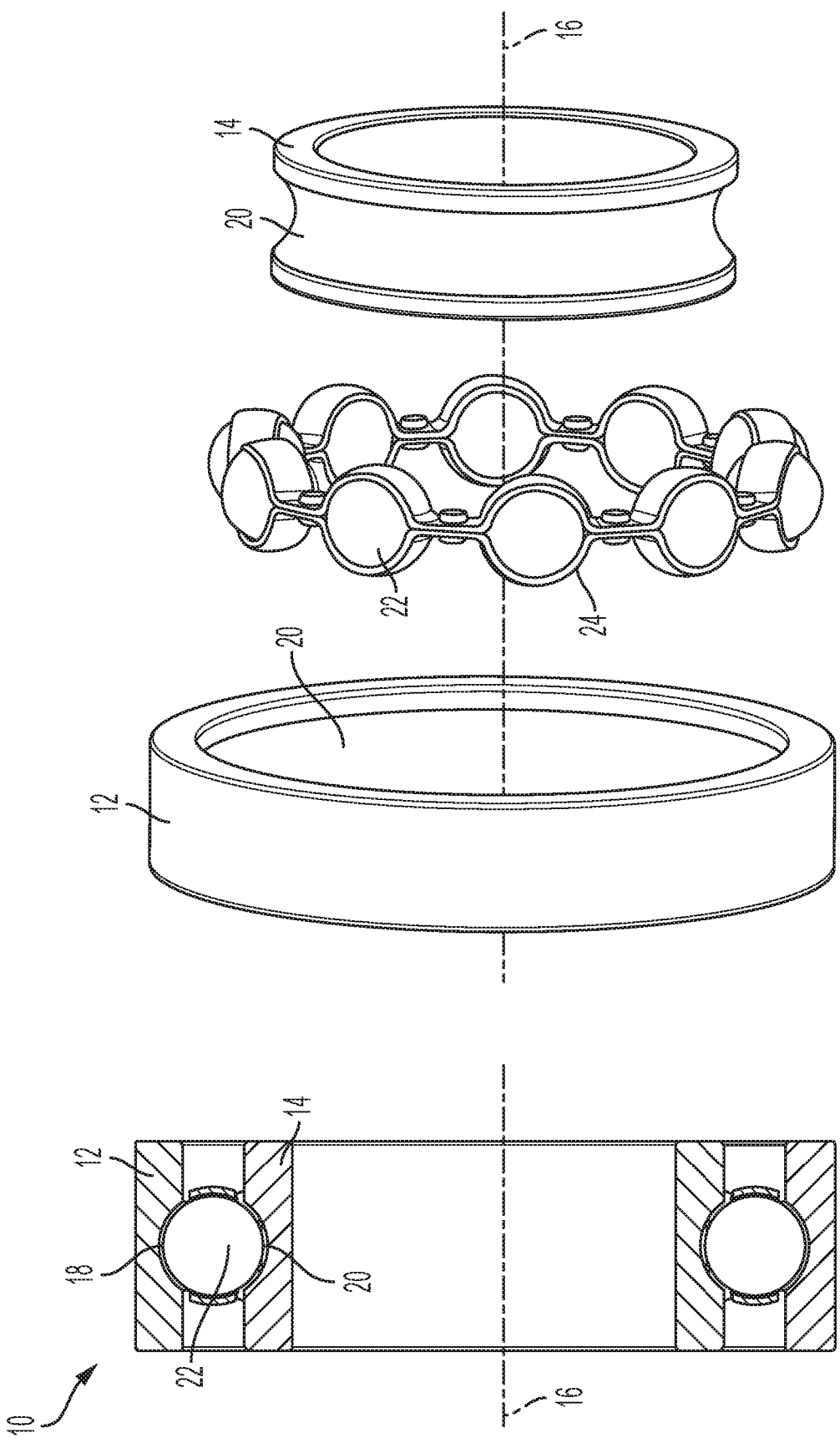

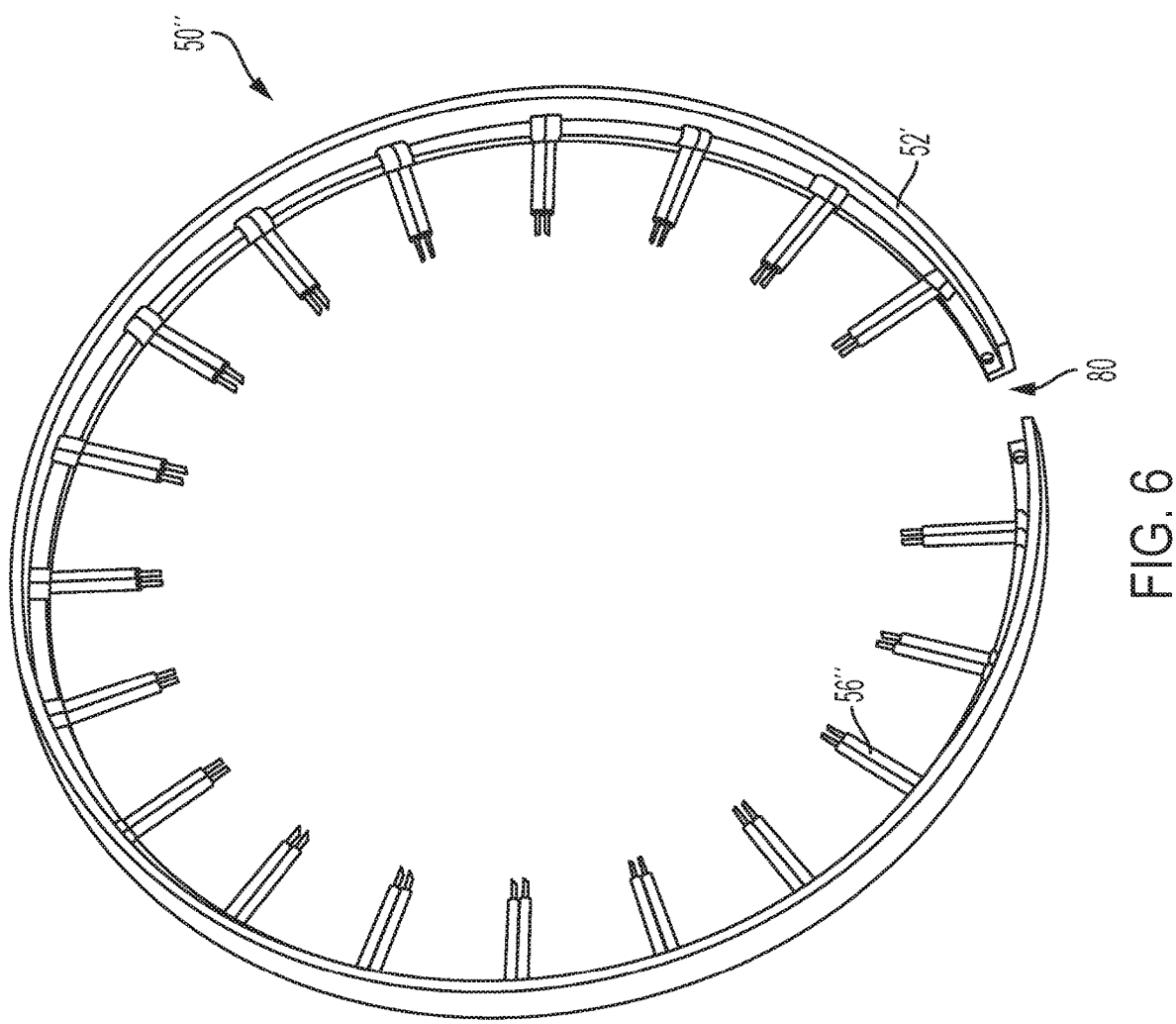

US 10,883,541 B2

ELECTRICALLY ISOLATED NON-SEALED BEARING

TECHNICAL FIELD

The present disclosure relates to an electrical shunt formed integral or assembled within a bearing. In particular, the electrical shunt may be specifically designed for wet (non-sealed) bearing, such as a bearing subjected to lubricant such as automatic transmission fluid.

BACKGROUND

Bearings are used in a plethora of applications in which relative rotation is desired between two coaxial components. Bearings such as roller bearings may include an inner ring with a raceway, an outer ring with a raceway, and a plurality of rolling elements (e.g., balls) between the raceways. In some applications, the bearings are sealed such that no fluid, debris, etc. is able to enter the raceways and impair the operability of the bearing. In other applications, the bearings are not sealed (open) to allow fluid (e.g., lubricant) to pass through the bearing during operation. Both sealed and non-sealed bearings alike can be used in applications in which electrical current (leakage current) is present. These leakage currents, if not properly grounded or diverted, can impair the operability of the bearing or cause damage. If this occurs frequently, bearings may have to be replaced at regular intervals and repairs can get expensive.

SUMMARY

According to one embodiment, a bearing includes an inner ring extending about an axis and having an outer surface defining a first pocket therein, wherein a surface of the first pocket is provided with a first conductive coating. The bearing includes an outer ring concentric with and radially outward from the inner ring, the outer ring having an inner surface defining a second pocket therein, wherein a surface of the second pocket is provided with a second conductive coating. A plurality of rolling elements are disposed between the inner ring and the outer ring. An electrically-conductive shunt ring assembly couples the inner ring to the outer ring and is configured to inhibit electrical current passing between the inner ring and outer ring from passing through the rolling elements. The shunt ring assembly is sized and configured to enable lubricant to flow freely through the bearing, and the shunt ring assembly contacts the first and second conductive coatings.

In yet another embodiment, a bearing includes an inner ring extending about an axis and having an outer surface that defines an inner raceway of the bearing, wherein the outer surface is provided with a first conductive coating that does not cover the inner raceway. The bearing includes an outer ring concentric with and radially outward from the inner ring, the outer ring having an inner surface that defines an outer raceway of the bearing, wherein the inner surface is provided with a second conductive coating that does not cover the outer raceway. A plurality of rolling elements are disposed between the inner ring and the outer ring. An electrically-conductive shunt ring assembly couples the inner ring to the outer ring and is configured to inhibit electrical current passing between the inner ring and outer ring from passing through the rolling elements. The shunt ring assembly is sized and configured to enable lubricant to flow freely through the bearing, and the shunt ring assembly contacts the first and second conductive coatings.

In yet another embodiment, a bearing includes an inner ring extending about an axis and having an outer surface defining a first pocket therein. An outer ring is concentric with and radially outward from the inner ring, and the outer ring has an inner surface defining a second pocket therein. A plurality of rolling elements are disposed between the inner ring and the outer ring. An electrically-conductive shunt ring assembly couples the inner ring to the outer ring and is configured to inhibit electrical current passing between the inner ring and outer ring from passing through the rolling elements. The shunt ring assembly is sized and configured to enable lubricant to flow freely through the bearing. The shunt ring assembly includes a non-continuous shunt ring engaged to one of the inner ring and the outer ring via a snap fit within one of the first pocket and second pocket.

BRIEF DESCRIPTION OF THE DRAWINGS

FIG. 1A is a cross-sectional view of a bearing (a ball bearing is shown as an example) without a shunt assembly (described below) assembled thereto according to one embodiment, and FIG. 1B is an exploded perspective view of the bearing of FIG. 1A.

FIG. 6 is a perspective view of a shunt assembly for assembly into a bearing, according to yet another embodiment.

DETAILED DESCRIPTION

Figure 2C:
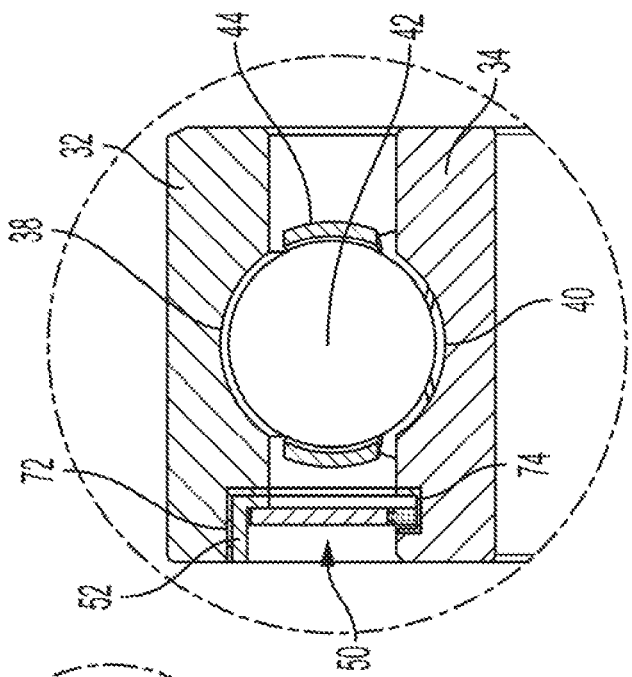
FIG. 2C is an enlarged view of region 2C of FIG. 2B.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures.

A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis.

FIG. 1A illustrates a cross-sectional view of an assembled bearing 10, and FIG. 1B illustrates an exploded perspective view of the bearing 10. The components shown in these Figures are base components similar to the bearing disclosed in U.S. patent application Ser. No. 15/837,220, which is hereby incorporated by reference in its entirety. The teachings described below can be implemented in any roller bearing, and the ones shown herein are merely exemplary. The bearing 10 shown in these Figures also does not show the conductive shunt assembly or coatings that are disclosed in the remaining Figures. The bearing 10 includes an outer ring 12 and an inner ring 14. Each ring extends about a central axis 16. The outer ring 12 has an inner surface facing the central axis 16 that defines a concave outer raceway 18 facing the axis 16. Likewise, the inner ring 14 has an outer surface facing away from the central axis 16 that defines a concave inner raceway 20 facing away from the axis 16.

In the illustrated embodiment, the bearing is a rolling element bearing having a plurality of rolling elements 22. However, in other embodiments, the bearing is a non-rolling element bearing, such as a plain bearing, a flexure bearing, etc. The rolling elements 22 are shown as spherical ball rolling elements. In other embodiments, the rolling elements are other shapes such as cylindrical, spherical, frustoconical, and other shapes appreciable by those skilled in the art. The rolling elements 22 rest between and contact the raceways of the outer ring 12 and the inner ring 14. In one embodiment, the rolling elements 22 are mounted within, and retained, and can fully rotate via a cage 24. The cage 24 reduces friction, wear, and bind by preventing the rolling elements 22 from rubbing against each other during operation of the bearing 10. The rolling elements 22 enable relative rotational movement between an outer element (not shown) connected to the outer ring, and an inner element (not shown) connected to the inner ring. The embodiment shown here may be one in which the outer ring is stationary and the inner ring rotates relative to the outer ring.

Rolling element bearings in automotive applications may be subject to electrical current (leakage currents) passing through, seeking ground. This can particularly occur in hybrid vehicles, for example with a bearing for the electric motor. Electric arcing through the bearing raceways and rolling elements can cause electric discharge machining (EDM) damage. Over time, this has the potential to degrade the quality of the rolling elements and raceways of the bearing. Some bearing applications require lubricants, such as automatic transmission fluid (ATF), to be able to pass through the bearing. These are known as wet or non-sealed bearings.

If a leakage current passes continuously through a non-sealed bearing running in the presence of a lubricant, depending on the dielectric strength of the lubricant, after a certain shaft voltage is reached, the leakage current can break through the lubricant if unaccounted for. Rolling motion of the rolling elements subjected to these leakage currents can cause electrical arcing and change the material structure. This can lead to frosting of the rolling elements fluting on the raceways. If this phenomenon continues for a prolonged period, rolling elements and raceway surfaces roughen, untempered martensite can form on the circumference of the raceways (rehardened zones can be observed microstructurally), bearing can become noisy and can have an increased probability of pre-mature failure.

Therefore, according to various embodiments of this disclosure, the bearing disclosed herein is a non-sealed bearing having a shunt device or shunt assembly to safely bypass electric current around the bearing raceways and rolling elements to ground while still enabling a free flow of lubricant across the bearing. The remaining Figures (FIGS. 2A-6) show the bearing provided with such a shunt device or shunt assembly.

Parts of the bearing 10 of FIGS. 1A-1B are implemented into the remaining Figures, such as the inner ring, the outer ring, the rolling elements, and the cage. While new reference numbers are used in the remaining Figures, the description of FIG. 1A-1B can be implemented into the embodiments of the remaining Figures with certain modifications, such as grooves to accommodate the shunt assembly.

Figure 2B:
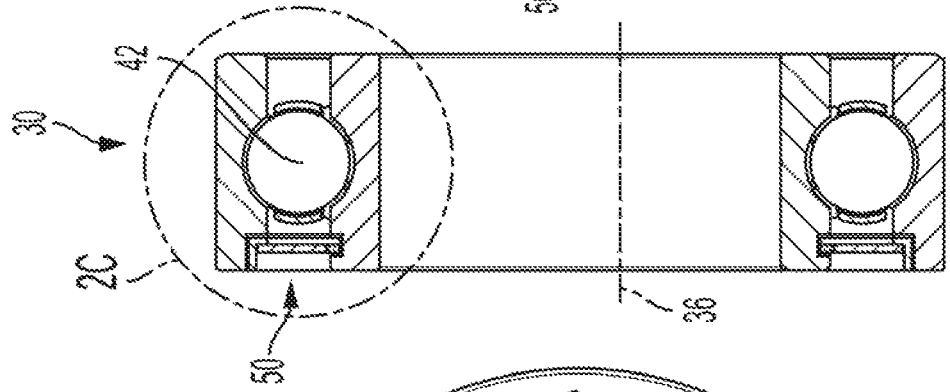
FIG. 2B is a cross-sectional view of the bearing of FIG. 2A.
Figure 2A:
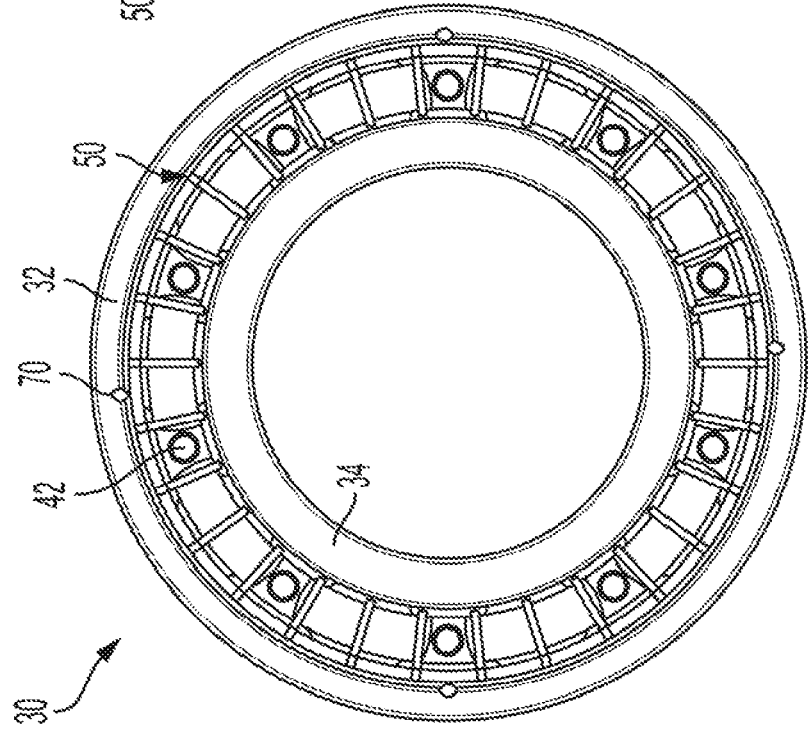
FIG. 2A is a front plan view of a bearing with a shunt assembly assembled thereto according to one embodiment.

FIG. 2A shows a front plan view of part of a bearing 30, FIG. 2B shows a cross-sectional view of the bearing 30, and FIG. 2C is an enlarged view of region 2C of FIG. 2B. The bearing 30 includes an outer ring 32 and an inner ring 34. Each ring extends about a central axis 36. The outer ring 32 has an inner surface facing the central axis 36 that defines a concave outer raceway 38 facing the axis 36. Likewise, the inner ring 34 has an outer surface facing away from the central axis 36 that defines a concave inner raceway 40 facing away from the axis 36. A plurality of rolling elements 42 are bound by a cage 44 and enable relative rotation between the inner ring 34 and the outer ring 32.

Figure 3:
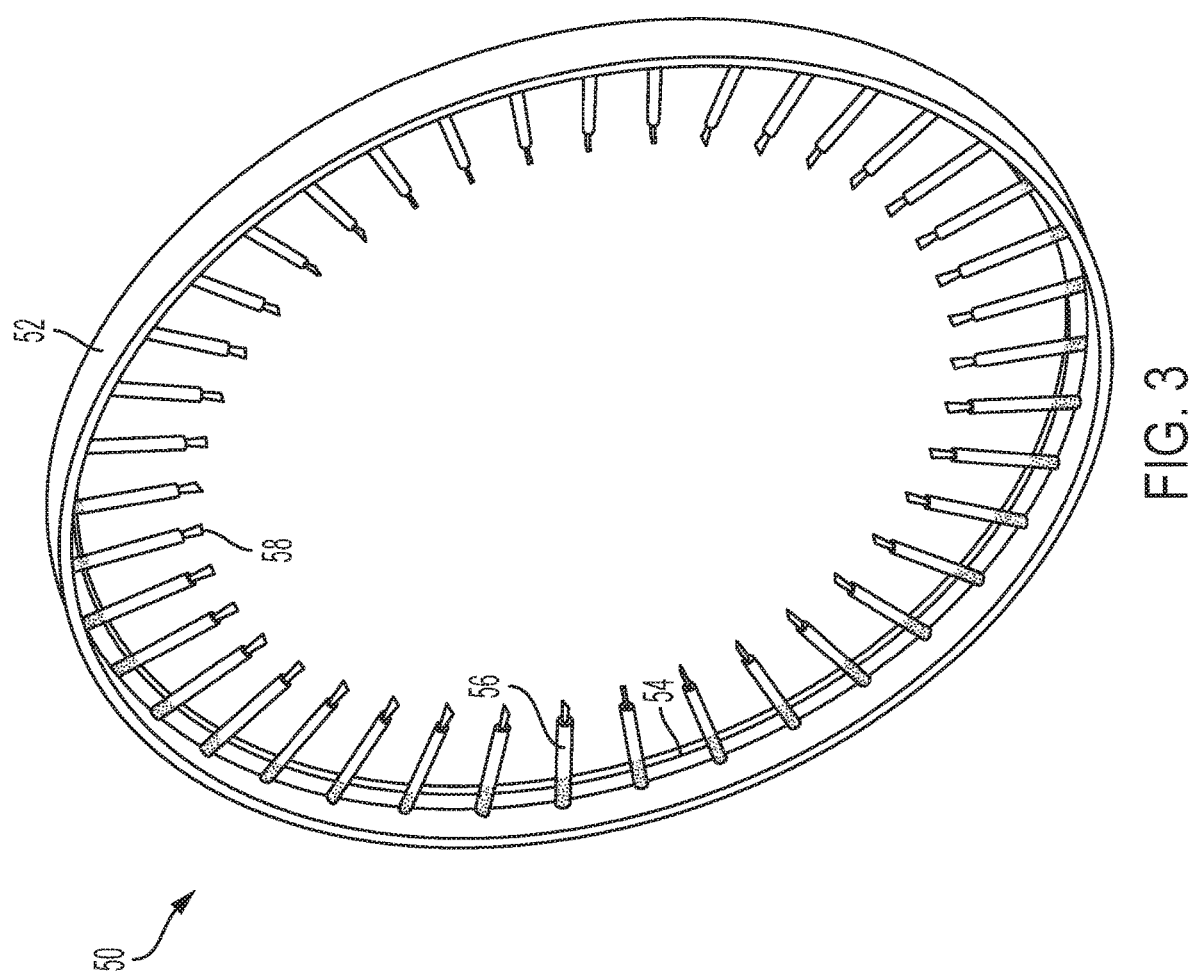
FIG. 3 is a perspective view of a shunt assembly for assembly into a bearing, according to one embodiment.
Figure 5:
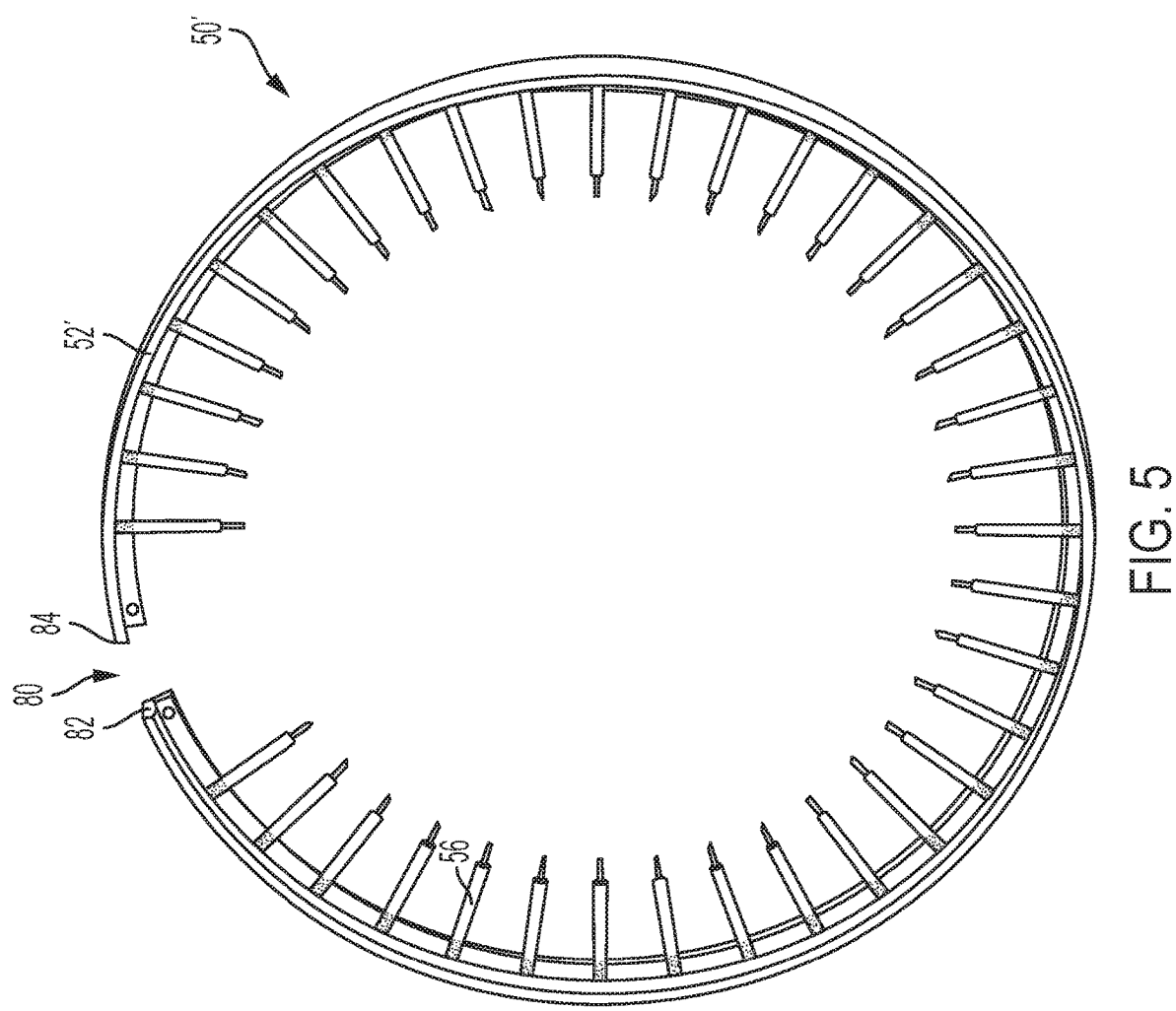
FIG. 5 is a perspective view of a shunt assembly for assembly into a bearing, according to another embodiment.

A shunt assembly 50 (also referred to as a shunt ring assembly) is configured for assembly within the bearing 30, and is shown in isolation in FIG. 3. The shunt assembly 50 includes an annular ring 52 (also referred to as a shunt ring) extending about the axis 36. The ring 52 may be a continuous ring (as shown in FIG. 3) formed by stamping, for example. Alternatively, the ring may be a non-continuous ring with a small break (as shown in FIGS. 5-6, described below). The shunt ring 52 is conductive, and can be made of any metal such as steel, for example. The shunt ring 52 may have a flange 54 that extends inward toward the axis 36. The flange 54 is provided to solder the ferrules (explained below) and inhibit or prevent potential damage to the soldered ferrules (explained below) during assembly of the shunt ring assembly 50 to the bearing 30.

The shunt ring assembly 50 is also provided with a plurality of ferrules 56 extending inwardly from an inner surface of the ring 52. The ferrules 56 can be conductive, also made of metal such as steel, copper or its alloys. In one embodiment, the ferrules 56 are soldered to the flange 54 if ferrules 56 and the flange 54 are made of dissimilar metals. The ferrules 56 can also be welded if both the shunt ring 52 and the ferrules 56 are ferrous. Each of the ferrules 56 holds a plurality of fibers, such as carbon fibers 58 which are also conductive. During assembly, the carbon fibers 58 may be crimped to the ferrules 56 (such as by the method disclosed in U.S. patent application Ser. No. 15/837,220, and then each ferrule 56 with crimped fibers 58 can be soldered to the flange 54 of the ring 52. Alternatively, the ferrules 56 can first be soldered or welded to the flange 54 of the ring 52, and thereafter the fibers 58 can be crimped or otherwise attached to each ferrule 56.

After assembly, the ferrules 56 extend slightly below the pitch diameter of the bearing 30. In other words, the rolling elements 42 can collectively define a pitch diameter extending through the center of the rolling elements 42. The ferrules 56 each extend closer to the center axis 36 than the center of the rolling elements 42. This minimizes flexing on the ferrules 56 and potential breakage of the conductive fibers 58.

FIG. 3 shows forty conductive ferrules 56, each with multiple conductive carbon fibers 58 crimped therewith. This is merely for illustration purposes. In other embodiments, more or less than forty ferrules 56 can be provided, depending on the size requirements of the bearing without restricting the lubrication flow.

In one embodiment, the shunt ring assembly 50 can be fitted within grooves or shoulders in the inner and outer rings of the bearing, and then tack welded at 70. For example, referring to FIGS. 2A-4B, the outer ring 32 may be provided with a recess 60 that may extend axially all the way to an axial face 62 of the outer ring 32. The inner ring 34 may be provided with a groove 64 that extends radially outward from an inner surface 66 of the inner ring 34. In the illustrated embodiment, the groove 64 does not extend axially all the way to an axial face 68 of the inner ring 34. The terms "recess" and "groove" are used herein to differentiate the shapes of the contours etched from the inner and outer rings, but these features can more generally be referred to as "pockets" which would include either a recess or a groove illustrated herein.

The outer surface of the ring 52 can be fitted within the recess 60 and connected thereto via tack welding, with tack welds shown generally at 70. The location of the tack welds 70 may be spaced annularly about the axis 36, and in the illustrated embodiment four tack welds 70 are provided. The tack welds 70 can ensure an effective circumferential contact between the ring 52 and the outer ring 32, for example if the ring 52 or the recess 60 are not sufficiently round or matching in shape. This can effectively bypass the leakage current to the outer ring 32 when appropriately grounded. The tack welding may be performed with compatible metals. The innermost portion of the fibers 58 contact the inner ring 34 within the groove 64. The groove 64 on the inner ring 34 may extend as deep as half of the thickness of the inner ring 34. In other words, the groove 64 may extend a quarter of the way through the inner ring 34. This allows the groove 64 to be configured to prevent the carbon fibers 58 from potentially losing contact with the inner ring 34 and keep the fibers 58 out of the raceway if they were to pop out of the groove 64.

Figure 4A:
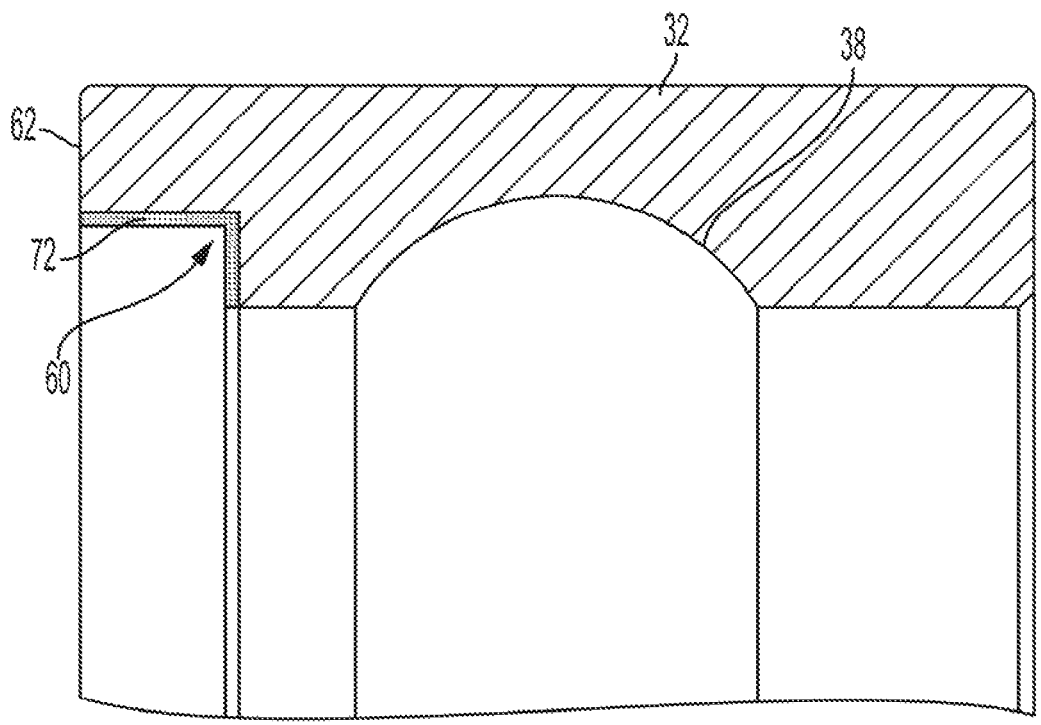
FIG. 4A is a cross-section view of a portion of the bearing of FIG. 2A with the shunt assembly removed to highlight a conductive coating on an outer ring of the bearing according to one embodiment.
Figure 4B:
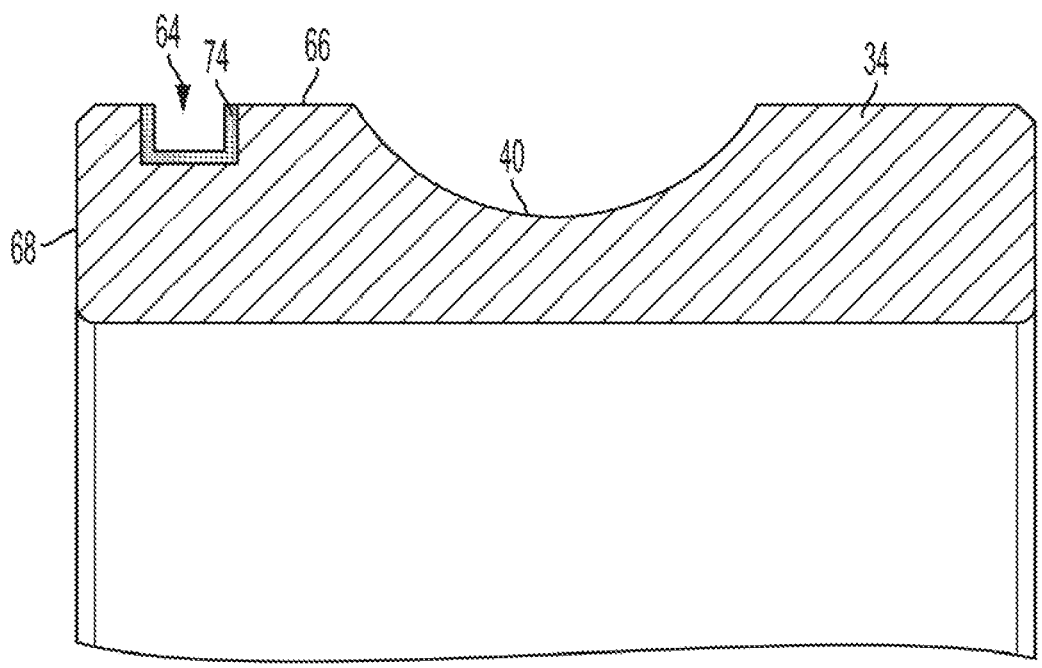
FIG. 4B is a cross-section view of a portion of the bearing of FIG. 2A with the shunt assembly removed to highlight a conductive coating on an inner ring of the bearing according to one embodiment.

The surfaces of the outer ring 32 that define the recess 60 may be coated with a conductive coating 72. Likewise, the surfaces of the inner ring 34 that define the groove 64 may be coated with a conductive coating 74. The coatings 72, 74 may be extremely thin, in the range of microns. FIGS. 4A and 4B have enlarged the coatings 72, 74 for illustrative purposes. The conductivity of the coatings 72, 74 can ensure a superior conductivity for the leakage current passing through the shunt assembly 50 between the inner and outer rings. The coatings 72, 74 may be copper or silver, for example, due to their properties of providing minimal electrical resistance compared to bearing steel. While the coatings 72, 74 are illustrated as covering the surfaces that define the recess 60 and the groove 64, the coatings 72, 74 may also be present in other areas of the outer surface of the inner ring and the inner surface of the outer ring, except not in areas of the raceway. Having a conductive coating in the raceway may interfere with operation of the rolling elements, including flaking off and hindering rolling of the rolling elements; further, the electrical current is intended to be diverted away from the raceway, so the conductive coating in the raceways may counter that goal.

The ring 52 may have a slight press fit or snug fit or slip fit within the recess 60 of the outer ring 32. A snug fit may minimize any possible damage to the shunt ring assembly 50 during assembly without flaking the conductive coating 72 off of the outer ring 32. Therefore, an interference fit may not be desirable in certain embodiments in which the layer of coating 72 is relatively thin.

FIG. 5 illustrates another embodiment of a shunt ring assembly 50'. In this embodiment, the shunt ring 52' is a non-continuous ring with a small break 80 between a pair of open ends 82, 84 facing one another. The break 80 is enlarged for illustrative purposes in FIGS. 5-6, and may be smaller than that shown. The ring 52' can be flexible, and can be slightly larger in diameter than the recess 60 when the ring 52' is not forced to constrict (e.g., left in an undisturbed state). During assembly, the ring 52' can act as a snap ring in which an operator can constrict the ring 52' and insert the ring 52' into the recess 60, and let go of the ring 52' so that the ring 52' is biased to expand outward into fit with the outer ring 32. In short, the ring 52' can be biased outwardly in a snap-fit engagement.

FIG. 6 illustrates another embodiment of a shunt ring assembly 50" having the same type of snap-fit ring 52' and break 80. This embodiment illustrates that the shunt ring assembly 50" can be provided with the ferrules 56' that are connected to the ring 52' in sets of multiple numbers, such as two. In other embodiments the ferrules can be soldered or welded to the ring in sets of three. These embodiments in which sets of ferrules are attached to the ring does not necessary require an increased number of ferrules in the assembly, as the same number of ferrules can be used but just arranged differently (e.g., in sets instead of individually).

It should be understood that the illustrations described above are merely exemplary. Other embodiments exist in which the components are rearranged. For example, the shunt assembly 50 can be reversed such that the ferrules extend radially outward from the outer surface of the ring. In that embodiment, the fibers would touch the outer ring of the bearing rather than the inner ring. The groove and the recess may be reversed in their respective location amongst the outer ring and the inner ring to accommodate this. Moreover, if the shunt ring is a snap-ring as described in embodiments above, the spring bias of the ring may be reversed such that it snaps and is biased inward so that the snap ring snaps to the inner ring of the bearing rather than the outer ring. This may be advantageous for embodiments in which the inner ring is stationary and the outer ring moves relative to the inner ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 bearing
12 outer ring
14 inner ring
16 central axis
18 outer raceway
20 inner raceway
22 rolling element
24 cage
30 bearing
32 outer ring
34 inner ring
36 central axis
38 outer raceway
40 inner raceway
42 rolling element
44 cage
50 shunt assembly or shunt ring assembly
50' shunt assembly or shunt ring assembly
50" shunt assembly or shunt ring assembly
52 ring or shunt ring
52' ring or shunt ring
54 flange
56 ferrule
56' ferrule
58 conductive fibers
60 recess
62 axial face
64 groove
66 inner surface
68 axial face
70 tack weld
72 conductive coating
74 conductive coating
80 break or slit
82 open end
84 open end

What is claimed is:

1. A bearing comprising:
an inner ring extending about an axis and having an outer surface defining a first pocket therein, wherein a surface of the first pocket is provided with a first conductive coating;
an outer ring concentric with and radially outward from the inner ring, the outer ring having an inner surface defining a second pocket therein, wherein a surface of the second pocket is provided with a second conductive coating;
a plurality of rolling elements disposed between the inner ring and the outer ring; and
an electrically-conductive shunt ring assembly coupling the inner ring to the outer ring and configured to inhibit electrical current passing between the inner ring and outer ring from passing through the rolling elements, wherein the shunt ring assembly is sized and configured to enable lubricant to flow freely through the bearing, and wherein the shunt ring assembly contacts the first and second conductive coatings.

2. The bearing of claim 1, wherein the inner ring includes a pair of axial end surfaces, and the first pocket is a groove extending radially inward from the outer surface and not extending to either axial end surfaces.

3. The bearing of claim 1, wherein the outer ring includes an axial end surface, and the second pocket is a recess extending radially outward from the inner surface and axially to the axial end surface.

4. The bearing of claim 1, wherein the first and second coatings comprise silver or copper.

5. The bearing of claim 1, wherein the shunt ring assembly includes a conductive ring disposed within the second pocket and contacting the second conductive coating, a plurality of conductive ferrules extending radially inwardly from the conductive ring, and a plurality of fibers extending radially inwardly from each conductive ferrule and contacting the first conductive coating.

6. The bearing of claim 5, wherein the conductive ferrules are connected to the conductive ring via a solder or a weld.

7. The bearing of claim 5, wherein the conductive ring is coupled to the outer ring via tack welds.

8. The bearing of claim 5, wherein the conductive ring is non-continuous and has a pair of open ends defining a break therebetween.

9. The bearing of claim 8, wherein the conductive ring is a snap ring biased outwardly to provide a fitted engagement between the conductive ring and the outer ring.

10. The bearing of claim 5, wherein the plurality of conductive ferrules are grouped in sets about the axis, each set having a plurality of the conductive ferrules.

11. The bearing of claim 5, wherein the conductive ring includes an end with a flange extending radially inwardly.

12. A bearing comprising:
an inner ring extending about an axis and having an outer surface that defines an inner raceway of the bearing, wherein the outer surface is provided with a first conductive coating that does not cover the inner raceway;
an outer ring concentric with and radially outward from the inner ring, the outer ring having an inner surface that defines an outer raceway of the bearing, wherein the inner surface is provided with a second conductive coating that does not cover the outer raceway;
a plurality of rolling elements disposed between the inner ring and the outer ring; and
an electrically-conductive shunt ring assembly coupling the inner ring to the outer ring and configured to inhibit electrical current passing between the inner ring and outer ring from passing through the rolling elements, wherein the shunt ring assembly is sized and configured to enable lubricant to flow freely through the bearing, and wherein the shunt ring assembly contacts the first and second conductive coatings.

13. The bearing of claim 12, wherein the outer surface includes a first pocket defined therein that is coated by the first conductive coating, and wherein the inner surface includes a second pocket defined therein that is coated by the second conductive coating.

14. The bearing of claim 13, wherein the shunt ring assembly includes:
- a conductive ring disposed within either the first pocket or second pocket and contacting either the first conductive coating or the second conductive coating;
- a plurality of conductive ferrules extending radially inwardly or radially outwardly from the conductive ring; and
- a plurality of fibers extending radially inwardly or radially outwardly from each conductive ferrule and contacting either the first conductive coating or the second conductive coating.

15. The bearing of claim 14, wherein the conductive ferrules are connected to the conductive ring via a solder or a weld.

16. The bearing of claim 14, wherein the conductive ring is coupled to either the outer ring or the inner ring via tack welds.

17. The bearing of claim 14, wherein the conductive ring is a non-continuous snap ring having a pair of open ends defining a break therebetween.

18. The bearing of claim 13, wherein the inner ring is provided with the first conductive coating only within the first pocket, and the outer ring is provided with the second conductive coating only within the second pocket.

19. A bearing comprising:
- an inner ring extending about an axis and having an outer surface defining a first pocket therein;
- an outer ring concentric with and radially outward from the inner ring, the outer ring having an inner surface defining a second pocket therein;
- a plurality of rolling elements disposed between the inner ring and the outer ring; and
- an electrically-conductive shunt ring assembly coupling the inner ring to the outer ring and configured to inhibit electrical current passing between the inner ring and outer ring from passing through the rolling elements, wherein the shunt ring assembly is sized and configured to enable lubricant to flow freely through the bearing, and wherein the shunt ring assembly includes a non-continuous shunt ring engaged to one of the inner ring and the outer ring via a snap fit within one of the first pocket and second pocket.

20. The bearing of claim 19, wherein the first pocket is coated with a first conductive coating, and the second pocket is coated with a second conductive coating.

* * * * *